United States Patent
Chen et al.

(10) Patent No.: US 11,805,550 B2
(45) Date of Patent: Oct. 31, 2023

(54) MULTIPLE-INPUT MULTIPLE-OUTPUT CHANNEL ACCESS

(71) Applicant: Intel Corporation, Santa Clara, CA (US)

(72) Inventors: Cheng Chen, Portland, OR (US); Carlos Cordeiro, Portland, OR (US); Claudio Da Silva, Portland, OR (US); Oren Kedem, Modiin Maccabim-Reut (IL)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 17/194,004

(22) Filed: Mar. 5, 2021

(65) Prior Publication Data
US 2021/0195642 A1    Jun. 24, 2021

Related U.S. Application Data

(63) Continuation of application No. 16/399,687, filed on Apr. 30, 2019, now abandoned.

(60) Provisional application No. 62/665,055, filed on May 1, 2018.

(51) Int. Cl.
*H04W 74/08* (2009.01)
*H04W 74/00* (2009.01)
*H04L 5/14* (2006.01)
*H04B 7/0413* (2017.01)

(52) U.S. Cl.
CPC ...... *H04W 74/0816* (2013.01); *H04B 7/0413* (2013.01); *H04L 5/14* (2013.01); *H04W 74/002* (2013.01)

(58) Field of Classification Search
CPC . H04W 74/00; H04W 74/002; H04W 74/004; H04W 74/006; H04W 74/008; H04W 74/08; H04W 74/0808; H04W 74/0816; H04W 74/0825; H04W 84/12; H04W 88/06; H04W 24/10; H04W 72/04; H04W 72/12; H04W 72/0446; H04L 5/14; H04L 5/1469; H04L 5/001; H04L 5/0005; H04L 5/0007; H04B 7/0413
See application file for complete search history.

(56) References Cited

U.S. PATENT DOCUMENTS

2019/0326972 A1*  10/2019  Yun ................... H04B 7/0413
2020/0162135 A1*   5/2020  Sun ................... H04W 80/08

* cited by examiner

*Primary Examiner* — Peter Chen
(74) *Attorney, Agent, or Firm* — Eversheds Sutherland (US) LLP

(57) ABSTRACT

This disclosure describes systems, methods, and devices related to multiple-input multiple-output (MIMO) channel access. A device may determine one or more time division duplex (TDD) service periods (SPs). The device may determine a directional multi-gigabit (DMG) frame to be sent to a responder device on a channel associated with a MIMO communication. The device may cause to send the DMG frame to the responder device on the channel. The device may establish a MIMO channel access based on sending the DMG frame to the responder device.

20 Claims, 11 Drawing Sheets

MULTIPLE-INPUT MULTIPLE-OUTPUT CHANNEL ACCESS

CROSS-REFERENCE TO RELATED APPLICATION(S)

This application is continuation of U.S. application Ser. No. 16/399,687, filed Apr. 30, 2019, which claims the benefit of U.S. Provisional Application No. 62/665,055, filed May 1, 2018, both disclosures of which are incorporated herein by reference as if set forth in full.

TECHNICAL FIELD

This disclosure generally relates to systems and methods for wireless communications and, more particularly, to multiple-input multiple-output (MIMO) channel access.

BACKGROUND

Wireless devices are becoming widely prevalent and are increasingly requesting access to wireless channels. The growing density of wireless deployments require increased network and spectrum availability. Wireless devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

DETAILED DESCRIPTION

Figure 1:
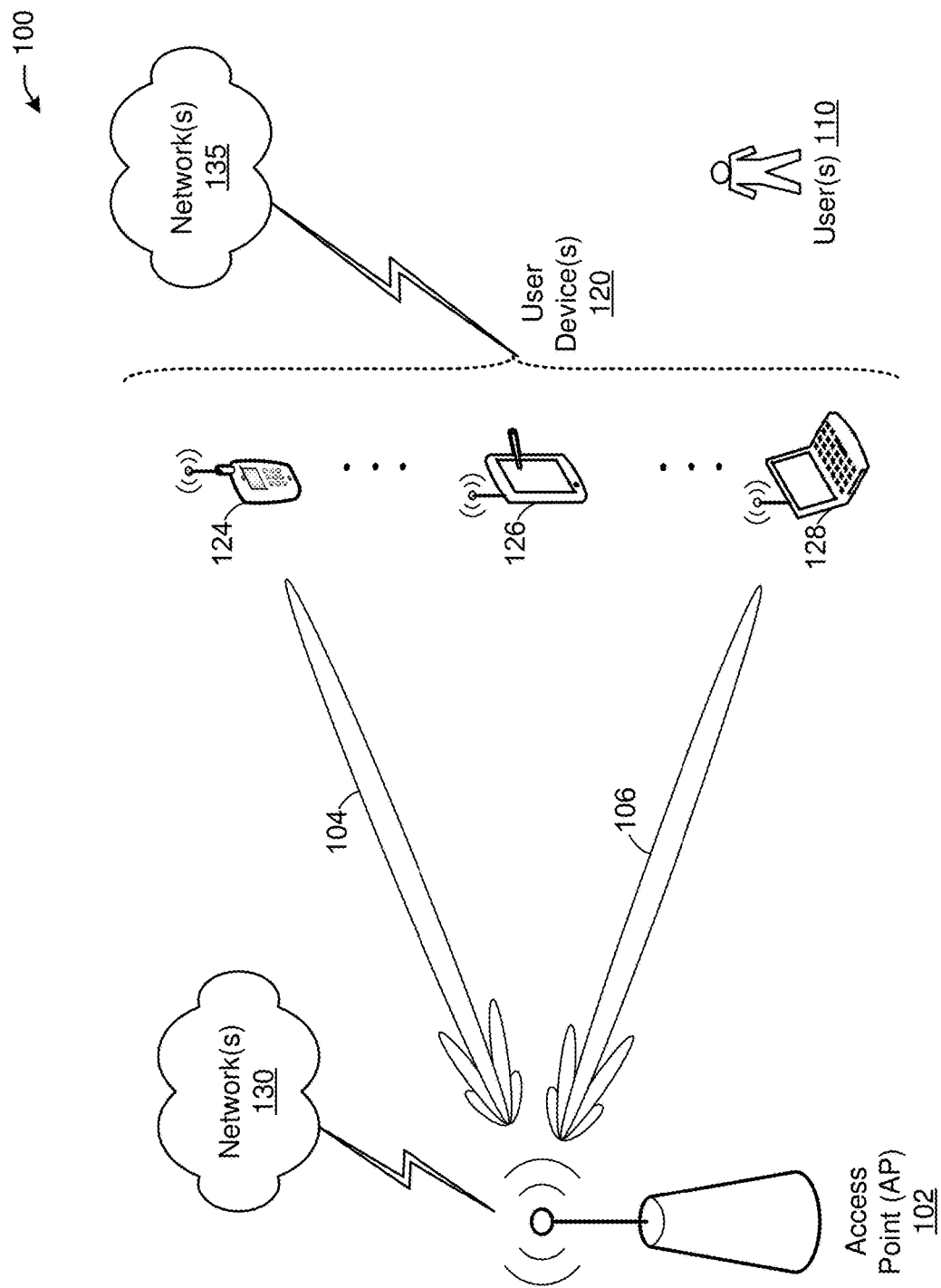
FIG. 1 depicts a network diagram illustrating an example network environment for MIMO channel access, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or APs or other devices capable of communicating in accordance to a communication standard.

IEEE 802.11ay task group continues to develop a standard related to mmWave (60 GHz) band which is an evolution of the IEEE 802.11ad standard also known as WiGig.

It should be noted that an enhanced directional multi-gigabit (EDMG) station device (STA) that obtains a transmit opportunity (TXOP) or is the source STA of an allocated service period (SP), and initiates multiple-input multiple-output (MIMO) channel access procedures is referred to as the initiator, and the EDMG STA(s) that is the intended receiver(s) of the MIMO transmission of the initiator is referred to as the responder(s). It should be understood that an allocated SP comprises a scheduled (e.g., by an access point) time slot that is allocated to the initiator in order for the initiator to transmit its data. Current MIMO channel access is not complete and the following issues remain without known solutions.

Current MIMO channel access only describes the rules and procedures to establish MIMO transmissions in contention based access periods (CBAPs) while maintaining physical carrier sense (CS), virtual CS and backoff procedures as defined for CBAP. There are no such rules and procedures for MIMO transmissions in SPs, where different clear channel assessment (CCA) is maintained.

Current SU-MIMO channel access flow requires request to send (RTS)/DMG clear to send (CTS) frame exchange between SU-MIMO initiator and responder. For example, the initiator would send an RTS frame to the responder (in one direction) and the responder would send CTS frame (in the reverse direction) to the initiator after receiving the RTS frame in order to complete the channel access. However, this flow does not work in a time division duplex (TDD) SP, where bidirectional traffic is not allowed in any TDD slot. Typically, a TDD schedule (allocated by an AP) may be comprised or divided into many TDD slots, where in each TDD slot, as explained, bidirectional traffic is not allowed. Basically, a device can either send or receive during those TDD timeslots and cannot send and receive during the same TDD slot. Therefore, the traffic is either downlink or uplink. As a result, a new SU-MIMO channel access flow is needed that does not require bidirectional traffic in order to enable SU-MIMO transmissions in a TDD SP.

MIMO channel access does not include any bandwidth negotiation, which means that a bandwidth negotiation process is missing in current MIMO channel access. MIMO transmission may span several 60 GHz channels per the channel availability at the initiator and the responder.

The CCA indicates whether a channel is idle or busy. Originally, the CCA is only one parameter, it does indicate from which antenna this indication is coming from. Therefore, in a MIMO channel access situation, where multiple antennas are used, multiple antenna CCA indication does not exist.

Example embodiments of the present disclosure relate to systems, methods, and devices for MIMO channel access for devices supporting multiple antennas.

A DMG communication may involve one or more directional links to communicate at a rate of multiple gigabits per second, for example, at least 1 gigabit per second, 7 gigabits per second, or any other rate. An amendment to a DMG operation in a 60 GHz band, (e.g., according to an IEEE 802.11ad standard), may be defined, for example, by an IEEE 802.1 lay project.

In some demonstrative embodiments, one or more devices may be configured to communicate over a next generation 60 GHz (NG60) network, an EDMG network, and/or any other network. For example, the one or more devices may be configured to communicate over the NG60 or EDMG networks.

In one or more embodiments, an MIMO channel access system may define the procedures for an initiator device and a responder device to negotiate the availability of the channel and to establish transmission accordingly.

In one or more embodiments, a MIMO channel access system may define the interface for the 802.11ay physical layer (PHY) to deliver the medium access control (MAC) and/or the CCA result per active supported antenna it senses.

In one or more embodiments, a MIMO channel access system may facilitate several changes on top of existing MIMO channel access rules and procedures.

In one or more embodiments, a MIMO channel access system may facilitate MIMO channel access rules and procedures for MIMO transmissions in service periods (SPs) with some necessary changes to accommodate the differences between CBAPs and SPs.

In one or more embodiments, a MIMO channel access system may add an option of single user (SU) multiple-input multiple-output (MIMO) channel flow that only requires SU-MIMO initiator to transmit directional multi-gigabit (DMG) clear to send (CTS)-to-self frame appended with a control trailer without responses back from the responder. Currently, the initiator sends an RTS and the responder would respond with a DMG CTS to confirm that the responder can participate in the MIMO communication this is considered a bidirectional traffic. This option of CTS-to-self only would therefore enable SU-MIMO channel access within a time division duplex (TDD) service period (SP).

In one or more embodiments, a MIMO channel access system may facilitate the bandwidth negotiation process between the initiator and responder for MIMO channel access. In 11ay, up to four channels can be aggregated. If an initiator wants to perform a MIMO communication with a responder, both the initiator and the responder need to check all the channels in order to be capable of communicating in MIMO. The initiator would listen to channels to determine which channels are idle and which ones are busy. In the control trailer, there is a dedicated bandwidth field. The initiator may indicate the available bandwidth in the RTS frame and the responder would indicate the available bandwidth in the CTS frame. This procedure ensures that only the available channels from both sides would be used. It should be understood that bandwidth uses a bitmap, where each bit in the bitmap indicates a channel. For example, there are eight channels in 802.1 lay and therefore the bitmap would contain eight different bits indicating each of these eight channels.

In one or more embodiments, a MIMO channel access system may facilitate the multiple antenna CCA indication upon which the MIMO channel access procedures depend. Typically, information associated with a channel is reported as being idle or busy, however, there is no indication of whether the antenna is busy or not. A MIMO channel access system may facilitate the indication of a status of an antenna of the one or more antennas of a station device. For example, a channel may be associated with a first antenna and a second antenna, such that the channel on the first antenna may be idle but the channel on the second antenna may be busy. In that case, the MIMO channel access system may facilitate multiple antenna CCA indication. That is the indication allows the PHY-SAP to inform the MAC-MLME the result of the CCA on each antenna supported and active. With those indications, the MAC is capable of performing accurate transmission decision if it initiates MIMO or SISO transmission.

In one or more embodiments, a MIMO channel access system may facilitate that adding DMG CTS-to-self option to SU-MIMO channel access makes the SU-MIMO and MU-MIMO channel access procedures aligned and consistent, since MU-MIMO channel access flow also consists of the two options of request to send (RTS)/DMG CTS exchange and DMG CTS-to-self alone.

In one or more embodiments, a MIMO channel access system may add bandwidth negotiation process for MIMO channel access to enable the initiator and the responder(s) to negotiate the available channels in which their CCA indication was idle on both sides of the initiator and responder and to establish MIMO transmissions over multiple channels with increased throughput and robustness.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for MIMO channel access, in accordance with one or more example embodiments of the present disclosure.

Wireless network 100 may include one or more user device(s) 120 and one or more access point(s) (AP) 102, which may communicate in accordance with IEEE 802.11 communication standards, such as IEEE 802.11ay, IEEE 802.11ad, millimeter-wave, and WiGig specifications. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

Figure 4:
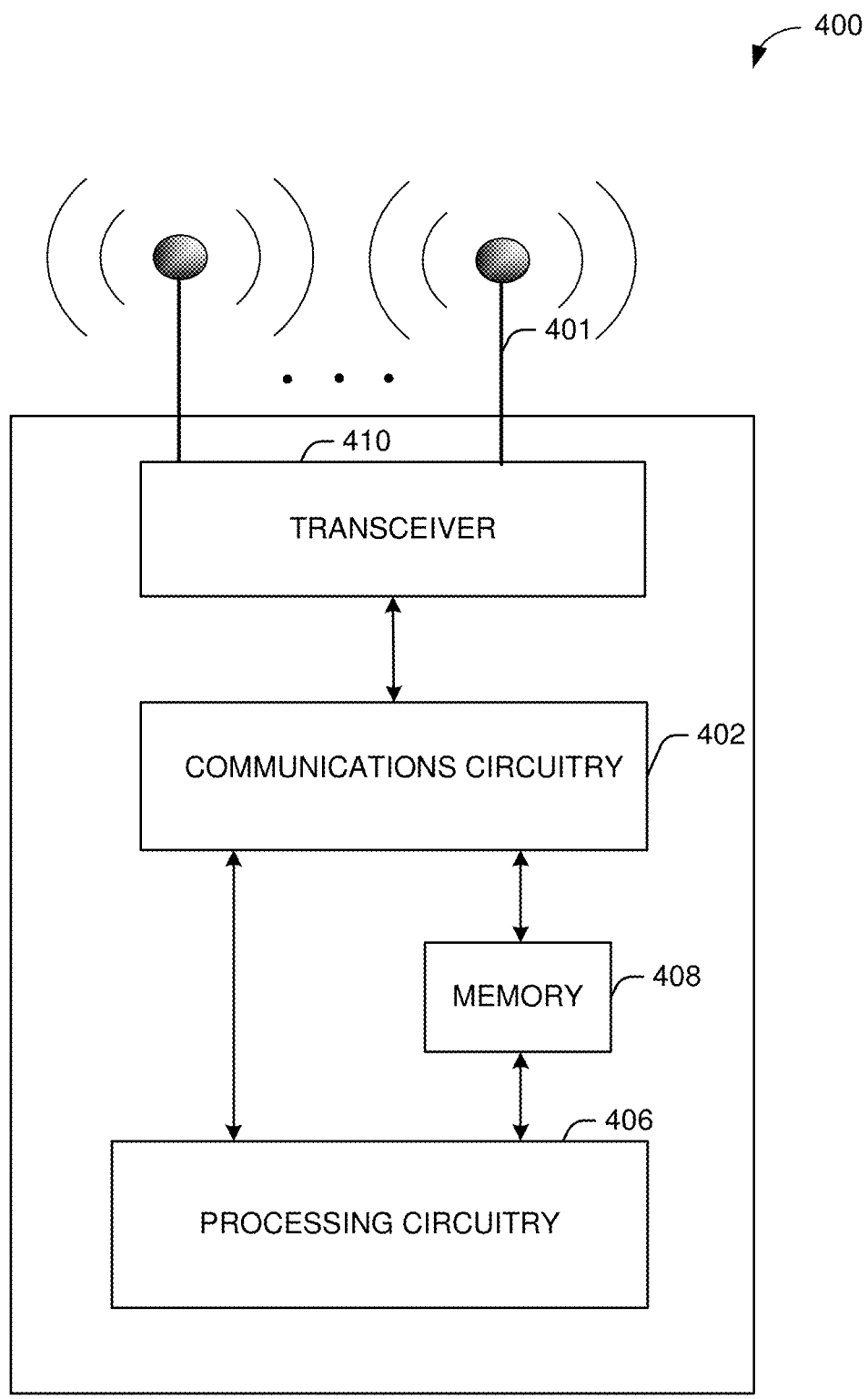
FIG. 4 illustrates a functional diagram of an example communication station that may be suitable for use as a user device, in accordance with one or more example embodiments of the present disclosure.
Figure 5:
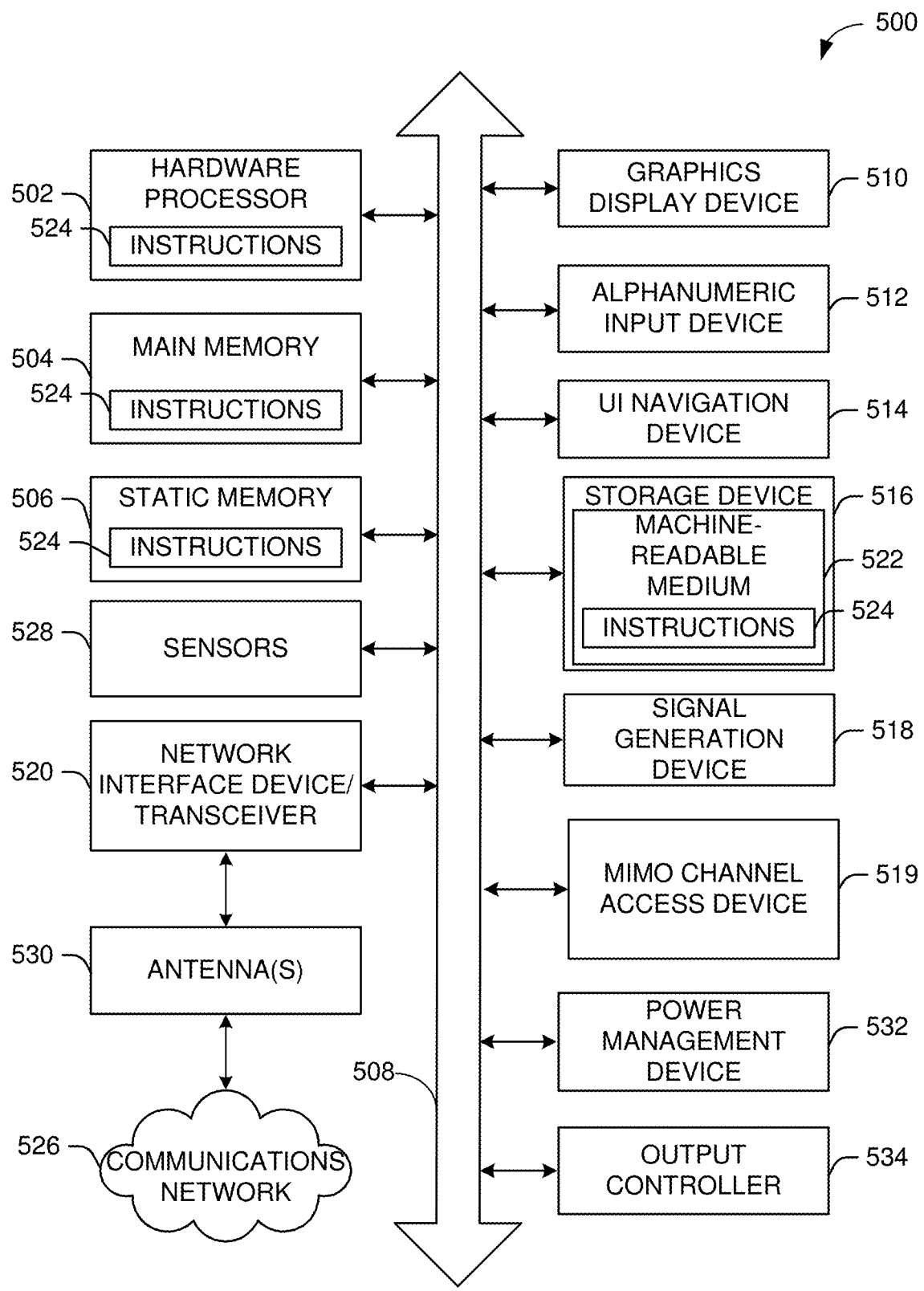
FIG. 5 illustrates a block diagram of an example machine upon which any of one or more techniques (e.g., methods) may be performed, in accordance with one or more example embodiments of the present disclosure.

In some embodiments, the user device(s) 120 and the AP 102 may include one or more computer systems similar to that of the functional diagram of FIG. 4 and/or the example machine/system of FIG. 5.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, (e.g., a static), device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the user devices 120 and/or AP 102.

Any of the user devices 120 (e.g., user devices 124, 126, 128), and AP 102 may include multiple antennas that may include one or more directional antennas. The one or more directional antennas may be steered to a plurality of beam directions. For example, at least one antenna of a user device 120 (or an AP 102) may be steered to a plurality of beam directions. For example, a user device 120 (or an AP 102) may transmit a directional transmission to another user device 120 (or another AP 102).

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

It is understood that a basic service set (BSS) provides the basic building block of an 802.11 wireless LAN. For example, in infrastructure mode, a single access point (AP) together with all associated stations (STAs) is called a BSS.

In some demonstrative embodiments, and/or AP 102 may be configured to support one or more mechanisms and/or features, for example, channel bonding, single user (SU) MIMO, and/or and multi user (MU) MIMO, for example, in accordance with an EDMG Standard, an IEEE 802.11ay standard and/or any other standard and/or protocol.

In one embodiment, and with reference to FIG. 1, an initiator (e.g., AP 102) may be configured to communicate with one or more responders (e.g., non-AP STAs, such as, user devices 120).

For example, in order for the AP 102 to establish communication with two devices (e.g., user device 124 and user device 128), the AP 102 may need to perform beamforming training with the user device 124 and the user device 128 using beams 104 and 106. The AP 102 may transmit one or more sector sweep (SSW) frames over different antenna sectors defined by the one providing high signal quality between the AP 102 and the user device 124 and the user device 128. However, the SSW frames may reach the user device 126. It is understood that the above descriptions are for purposes of illustration and are not meant to be limiting.

Figure 2A:
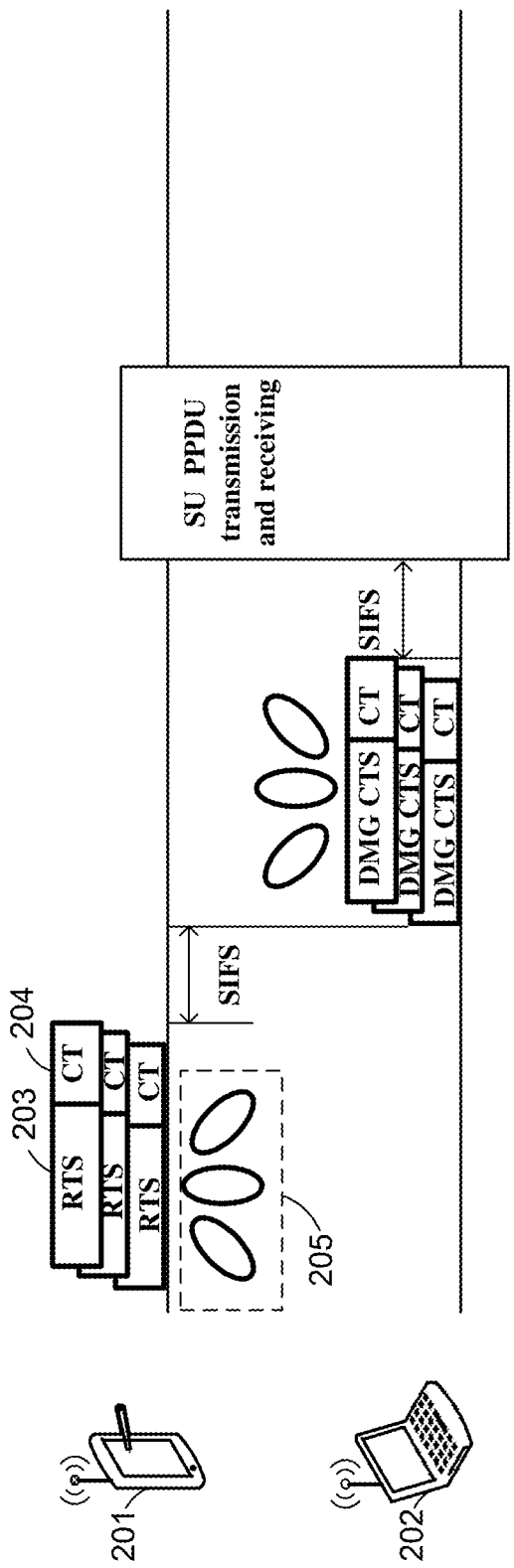
FIGS. 2A-2C depict illustrative schematic diagrams for MIMO channel access, in accordance with one or more example embodiments of the present disclosure.
Figure 2B:
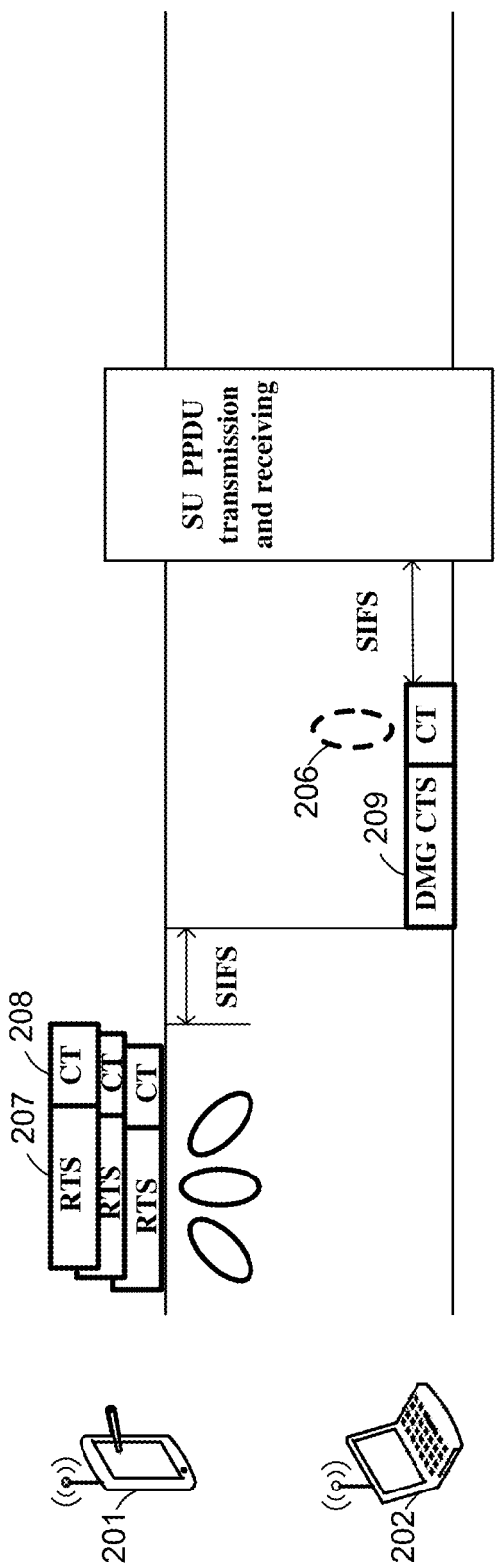
Figure 2C:
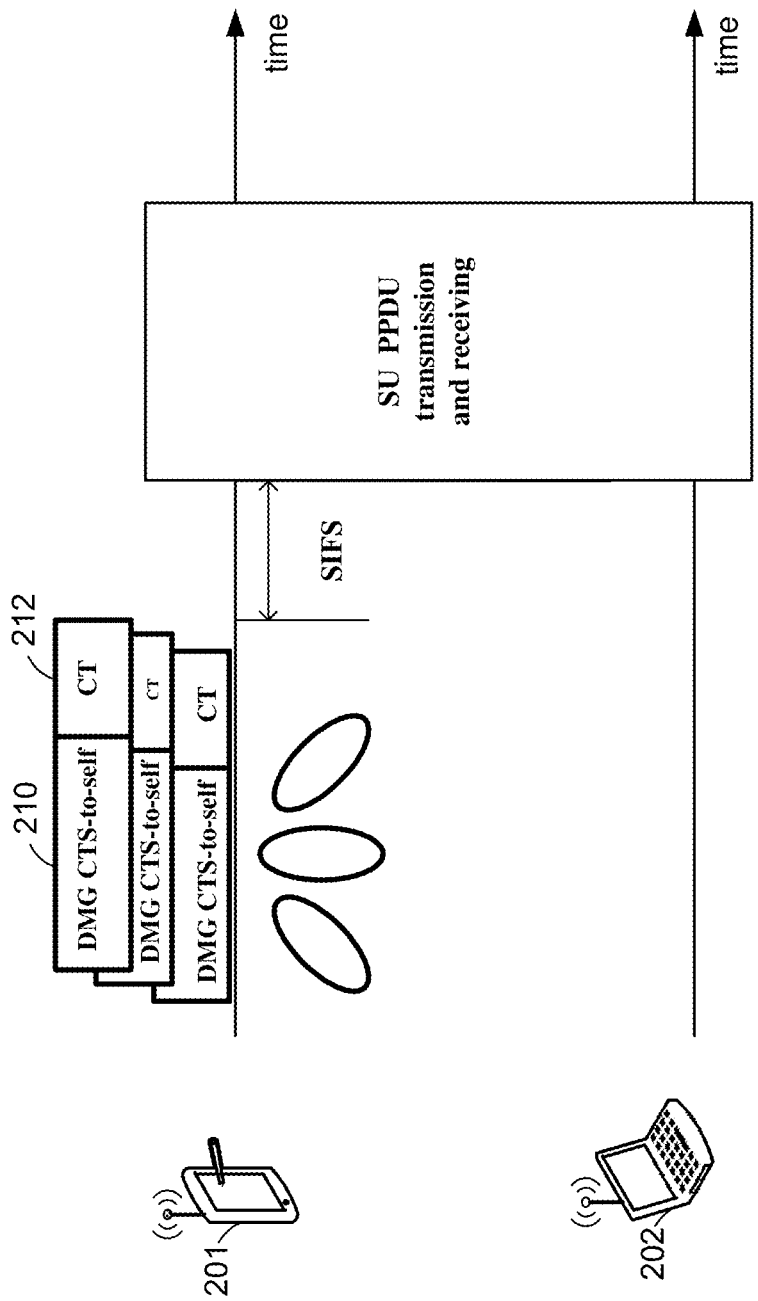

FIGS. 2A, 2B, and 2C depict illustrative schematic diagrams for MIMO channel access, in accordance with one or more example embodiments of the present disclosure.

Referring to FIG. 2A, there is shown a SU-MIMO channel access procedure when RTS/DMG CTS is used. In this scenario, an initiator 201 may be wanting to perform the necessary steps for SU-MIMO channel access with a responder 202. The initiator 201 may send directional frames (e.g., RTS 203, with a control trailer 204) on various SISO antenna settings 205. In this case, the responder 202 uses SU-MIMO for the transmission of reverse direction (e.g., towards the initiator 201). The responder device may respond with directional DMG clear to send (CTS) frames each having a control trailer field. After the bidirectional communication (e.g., RTS and CTS exchange) between the initiator 201 and the responder 202, the SU PPDU transmission and receiving begins between the initiator 201 and the responder device 202.

In one or more embodiments, a MIMO channel access system may define MIMO channel access rules and procedures for MIMO transmissions in time division duplex (TDD) with service periods (SPs) as resources to be used for data transmission. Since an SP is scheduled, there is no clear channel assessment (CCA) or backoff done within the SP as the devices are not competing for that resource. In SP, unlike the contention based access period (CBAP), the MIMO initiator (e.g., initiator 201) can transmit a MIMO PPDU regardless of the STATE parameter of PHY-CCA.indication within the SP. Therefore, the initiator 201 does not need to verify the channel access before establishing MIMO channel access.

Referring to FIG. 2B, there is shown a SU-MIMO channel access procedure when RTS/DMG CTS is used. In this scenario, an initiator 201 may be wanting to perform the necessary steps for SU-MIMO channel access with a responder 202. The initiator 201 may send directional frames (e.g., RTS 207, with a control trailer 208) using SISO antenna settings 206. In this case the responder 202 uses SISO for the transmission in the reverse direction (e.g., towards the initiator 201). The responder 202 may respond with a directional DMG clear to send (CTS) frame 209 in a SISO mode (e.g., sending one directional DMG CTS frame to the initiator 201). After this bidirectional communication (e.g., RTS frames and CTS frame exchange) between the initiator 201 and the responder 202, the SU PPDU transmission and receiving begins between the initiator 201 and the responder device 202.

Referring to FIG. 2C, there is shown a SU-MIMO channel access procedure when DMG CTS-to-self is used, in accordance with one or more example embodiments of the present disclosure.

In FIG. 2C, there is shown a SU-MIMO channel access procedure when RTS/DMG CTS is used. In this scenario, an initiator 201 may be wanting to perform the necessary steps for SU-MIMO channel access with a responder 202.

In one or more embodiments, a MIMO channel access system may reuse the existing SU-MIMO and MU-MIMO channel access procedures without additional changes. That is, a MIMO channel access system may be capable of using bidirectional messaging in order to establish MIMO channel access between an initiator and a responder. However, a MIMO channel access system may also provide alternative options that may be more enhanced and efficient.

In one or more embodiments, a MIMO channel access system may add DMG CTS-to-self frame 210 as an alternative option apart from the current bidirectional exchange of RTS/CTS frames (as shown in FIGS. 2A-2B) for in order to establish SU-MIMO channel access. Currently, SU-MIMO channel access procedures require initiator and responder to perform RTS/DMG CTS frame exchanges. This flow does not work in a TDD SP since in every TDD slot within a TDD SP, only unidirectional traffic is allowed. In order to enable SU-MIMO channel access within a TDD SP, a MIMO channel access system may add another option. That is, an initiator may transmit DMG CTS-to-self frame 210 appended with a control trailer 212 to the responder 202. In this procedure the responder 202 is not required to confirm the establishment of the transmission by sending CTS (e.g., as was done in FIGS. 2A-2B) hence SU-MIMO transmission is established only with unidirectional transmission. In this case, no bidirectional traffic is required and thus suitable for TDD SPs.

In one or more embodiments, a MIMO channel access system may facilitate that DMG CTS-to-self frame may be transmitted using the same set of DMG antennas and antenna configuration planned to be used during the SU-MIMO transmission and a CSD between the transmissions in different antennas.

In one or more embodiments, in the control trailer 212, a SISO/MIMO field may be set to 1 and the SU/MU MIMO field may be set to 0 to indicate that the following transmission or hybrid beamforming is performed in SU-MIMO. The transmit (TX) Sector Combination Index field may indicate the corresponding DMG antenna configuration for the upcoming SU-MIMO transmission or hybrid beamforming.

In one or more embodiments, a MIMO channel access system may facilitate that a responder 202 that receives a DMG CTS-to-self frame 210 with a control trailer 212 indicating a SU-MIMO transmission or hybrid beamforming to itself may configure its DMG antennas according to the settings included in the TX Sector Combination Index field in the control trailer of the received CTS-to-self frame 210. The SU-MIMO transmission or hybrid beamforming begins SIFS interval following the end of the DMG CTS-to-self frame transmission by the initiator.

In one or more embodiments, a MIMO channel access system may facilitate Bandwidth negotiation process for MIMO channel access. IEEE 802.11ay allows bonding and aggregating channel transmission of up to four channels. A station device (STA) that would like to establish transmission (e.g., initiator 201) should perform CCA check of the channels to verify that those channels are not busy. If channels are busy with other station transmissions, the new established transmission will not succeed and will interfere with the existing user. Since the transmission in 802.11ay is directional, this operation should be performed by the responder 202 as well.

In one or more embodiments, a MIMO channel access system may facilitate that the initiator 202 may sense the channels and indicates the channels availability in the control trailer dedicated bandwidth (BW) field, which is appended to an RTS frame. The responder does the CCA check and confirms the used channels from those sent by the initiator 201 with their CCA being IDLE. This procedure ensures that only available channels from both sides will be used, thus robustness is increased. Since the RTS and DMG CTS are sent over the channels indicated in the BW field within the RTS or DMG CTS control trailer respectively, other stations are informed with the upcoming transmission and avoid initiating transmissions during the TXOP or SP.

In one or more embodiments, the bandwidth negotiation in case of MIMO channel access is achieved by indicating the IDLE channels in the BW field of the frame control trailer.

In one or more embodiments, a MIMO channel access system may facilitate a rule for the TXOP initiator to transmit RTS frame. If the TXOP is established to send at least one SU or MU PPDU, the RTS frame shall be sent in non-EDMG duplicate PPDU format, the TXVECTOR parameter SCRAMBLER_INIT_SETTING shall be set to indicate CONTROL_TRAILER and the parameter CT_TYPE shall be set to GRANT_RTS_CTS2Self. If the number of bits set in CH_BANDWIDTH is equal 1, STA may perform one of below options:
(1) Follow the procedure as defined in the paragraph above.
(2) Transmit the RTS in non-EDMG format.

In one or more embodiments, a MIMO channel access system may facilitate a rule for the TXOP responder to transmit CTS frame. If the network allocation vector (NAV) in the primary channel indicates idle. In case DMG CTS is sent in a non-EDMG duplicate PPDU format in response to an RTS sent to establish a TXOP for the transmission of a SU MIMO PPDU, the TXVECTOR parameters shall be configured as follows:
(1) SCRAMBLER_INIT_SETTING shall be set to indicate CONTROL_TRAILER and the parameter CT_TYPE shall be set to CTS DTS.
(2) CH_BANDWIDTH shall be set to channels that were indicated by the RTS's RXVECTOR CH_BANDWIDTH value and that CCA of the channels were idle for a duration of PIFS prior to the start of the RTS frame.

In one or more embodiments, a MIMO channel access system may facilitate multiple antenna CCA indication. IEEE 802.11ay is the first 802.11 technology that integrates multiple antennas design with directional transmission. In case of multiple antennas, the station is required to sense the CCA in the corresponding antenna in which it intends to transmit. By doing so, a MIMO channel access system may facilitate that the probability of transmission since CCA on the directional antenna has a good correlation with the upcoming transmission than Omni antenna. The new definition allows the PHY-SAP to inform the MAC-MLME the result of the CCA on each antenna supported and active. With those indications, the MAC is capable of performing accurate transmission decision if it initiates MIMO or SISO transmission. It should be noted that service access point (SAP) that is an interface between the PHY and MAC layers.

In one or more embodiments, a MIMO channel access system may facilitate add the [antenna-list] variable to the PHY SAP interface in which the CCA results are delivered to the flay MAC in order to determine what are the transmission characteristics that can be performed as shown in the table below.

| Parameter | Associated primitive | Value |
| --- | --- | --- |
| DATA | PHY-DATA.request PHY-DATA.indication | Octet value X'00'-X'FF' |
| TXVECTOR STATE | PHY-TXSTART.request PHY-CCA.indication | A set of parameters (BUSY, [channel-list], [antenna-list]) (IDLE, [antenna-list]) |

In one or more embodiments, a rule for the STA may be to associate the CCA indication received on a specific channel to the antenna used in the respective CCA measurement from which it was received.

In case of an EDMG STA, the channel-list parameter contains the primary and secondary and may contain the secondary1 and secondary2, the RX-antenna-ID parameter indicates one or a set of IDs of the DMG antennas in which the channel indication is provided.

It is understood that the above descriptions are for purposes of illustration and are not meant to be limiting.

Figure 3:
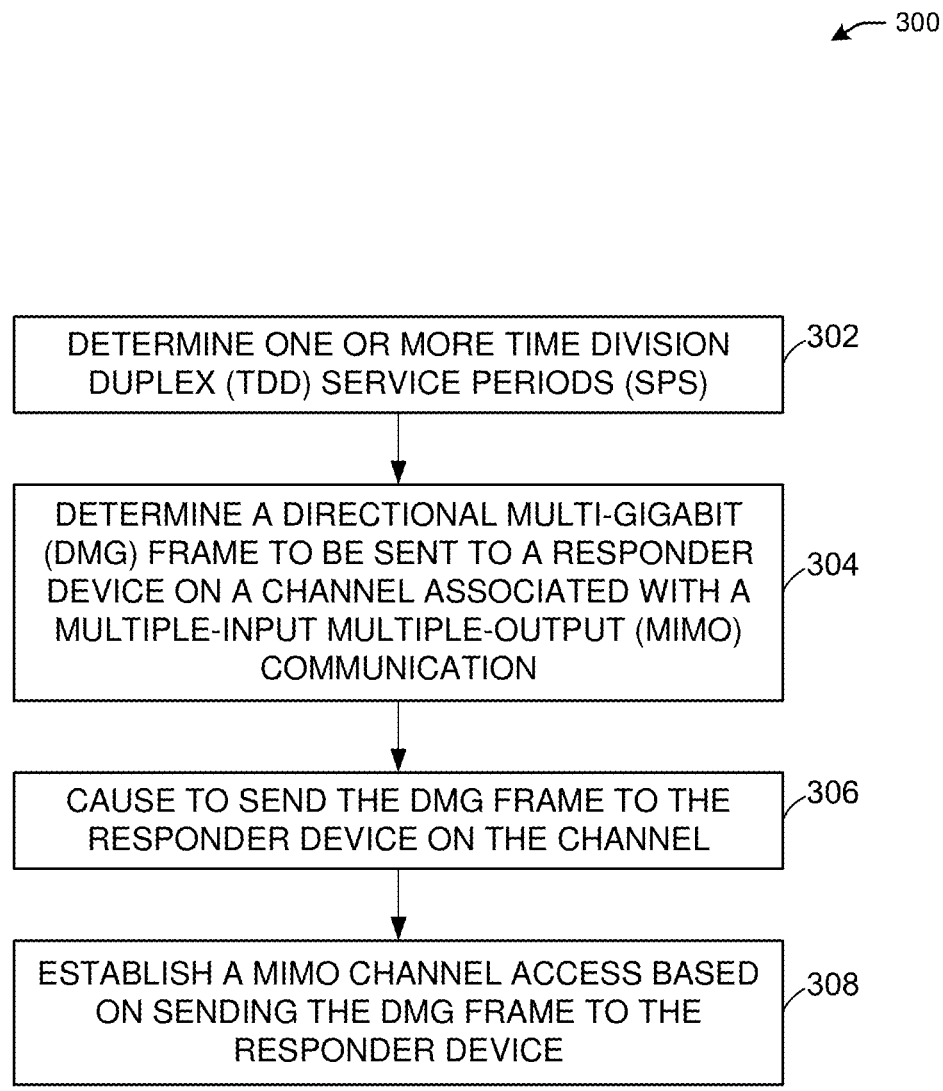
FIG. 3 illustrates a flow diagram of illustrative process for an illustrative MIMO channel access system, in accordance with one or more example embodiments of the present disclosure.

FIG. 3 illustrates a flow diagram of illustrative process 300 for an illustrative MIMO channel access system, in accordance with one or more example embodiments of the present disclosure.

At block 302, a device (e.g., the user device(s) 120 and/or the AP 102 of FIG. 1) may determine one or more time division duplex (TDD) service periods (SPs).

At block 304, the device may determine a directional multi-gigabit (DMG) frame to be sent to a responder device on a channel associated with a multiple-input multiple-output (MIMO) communication.

At block 306, the device may cause to send the DMG frame to the responder device on the channel.

At block 308, the device may establish a MIMO channel access based on sending the DMG frame to the responder device.

It is understood that the above descriptions are for purposes of illustration and are not meant to be limiting.

FIG. 4 shows a functional diagram of an exemplary communication station 400 in accordance with some embodiments. In one embodiment, FIG. 4 illustrates a functional block diagram of a communication station that may be suitable for use as an AP 102 (FIG. 1) or user device 120 (FIG. 1) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in FIGS. 1-3.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device memory.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), a MIMO channel access device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The MIMO channel access device 519 may carry out or perform any of the operations and processes (e.g., process 300) described and shown above.

It is understood that the above are only a subset of what the MIMO channel access device 519 may be configured to perform and that other functions included throughout this disclosure may also be performed by the MIMO channel access device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as, but not limited to, read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 6:
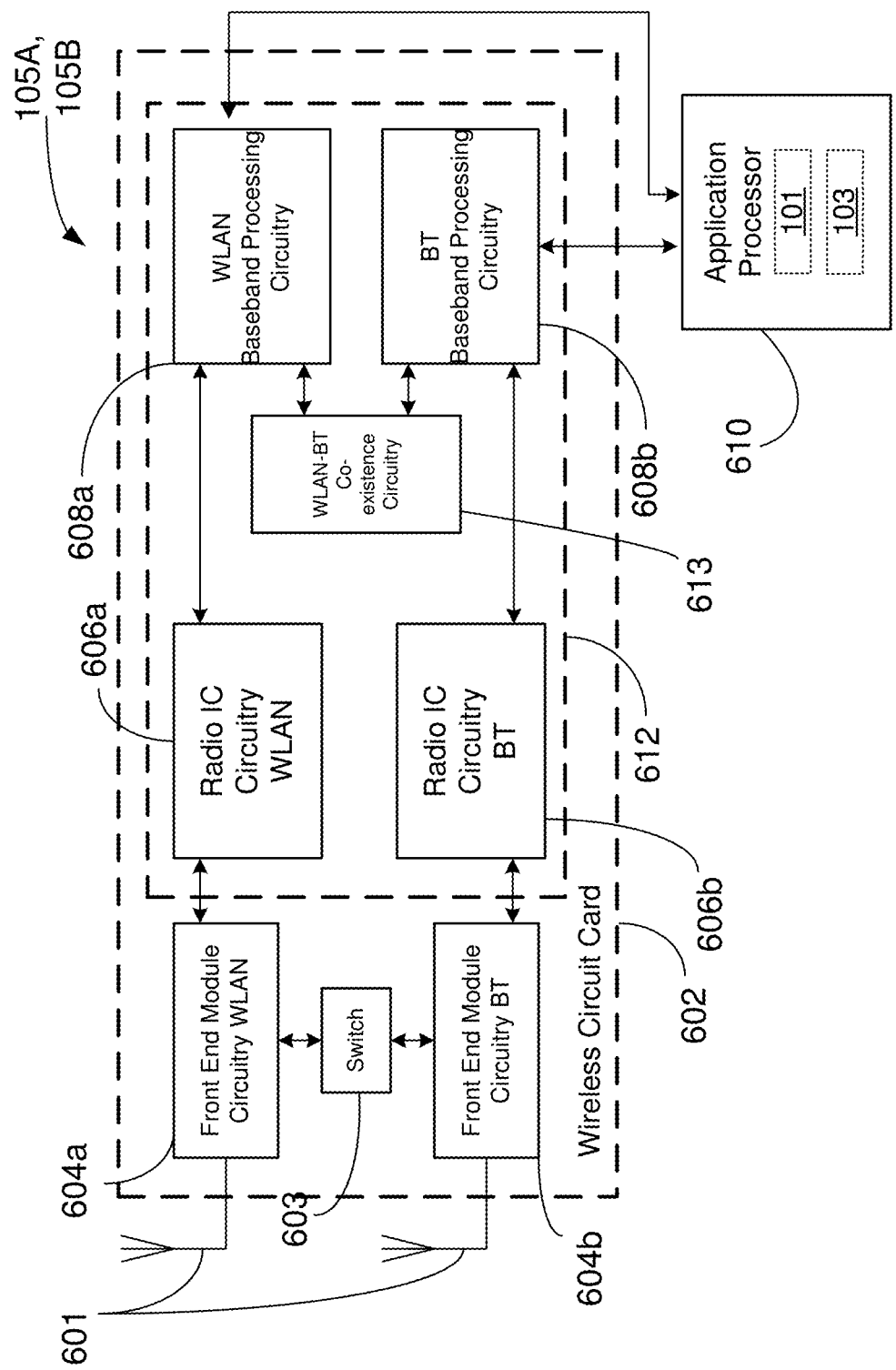
FIG. 6 is a block diagram of a radio architecture in accordance with some examples.

FIG. 6 is a block diagram of a radio architecture 105A, 105B in accordance with some embodiments that may be implemented in any one of the example AP 102 and/or the example user device 120 of FIG. 1. Radio architecture 105A, 105B may include radio front-end module (FEM) circuitry 604*a-b*, radio IC circuitry 606*a-b* and baseband processing circuitry 608*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 604*a-b* may include a WLAN or Wi-Fi FEM circuitry 604*a* and a Bluetooth (BT) FEM circuitry 604*b*. The WLAN FEM circuitry 604*a* may include a receive signal path comprising circuitry configured to operate on WLAN RF signals received from one or more antennas 601, to amplify the received signals and to provide the amplified versions of the received signals to the WLAN radio IC circuitry 606*a* for further processing. The BT FEM circuitry 604*b* may include a receive signal path which may include circuitry configured to operate on BT RF signals received from one or more antennas 601, to amplify the received signals and to provide the amplified versions of the received signals to the BT radio IC circuitry 606*b* for further processing. FEM circuitry 604*a* may also include a transmit signal path which may include circuitry configured to amplify WLAN signals provided by the radio IC circuitry 606*a* for wireless transmission by one or more of the antennas 601. In addition, FEM circuitry 604*b* may also include a transmit signal path which may include circuitry configured to amplify BT signals provided by the radio IC circuitry 606*b* for wireless transmission by the one or more antennas. In the embodiment of FIG. 6, although FEM 604*a* and FEM 604*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 606*a-b* as shown may include WLAN radio IC circuitry 606*a* and BT radio IC circuitry 606*b*. The WLAN radio IC circuitry 606*a* may include a receive signal path which may include circuitry to down-convert WLAN RF signals received from the FEM circuitry 604*a* and provide baseband signals to WLAN baseband processing circuitry 608*a*. BT radio IC circuitry 606*b* may in turn include a receive signal path which may include circuitry to down-convert BT RF signals received from the FEM circuitry 604*b* and provide baseband signals to BT baseband processing circuitry 608*b*. WLAN radio IC circuitry 606*a* may also include a transmit signal path which may include circuitry to up-convert WLAN baseband signals provided by the WLAN baseband processing circuitry 608*a* and provide WLAN RF output signals to the FEM circuitry 604*a* for subsequent wireless transmission by the one or more antennas 601. BT radio IC circuitry 606*b* may also include a transmit signal path which may include circuitry to up-convert BT baseband signals provided by the BT baseband processing circuitry 608*b* and provide BT RF output signals to the FEM circuitry 604*b* for subsequent wireless transmission by the one or more antennas 601. In the embodiment of FIG. 6, although radio IC circuitries 606*a* and 606*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 608*a-b* may include a WLAN baseband processing circuitry 608*a* and a BT baseband processing circuitry 608*b*. The WLAN baseband processing circuitry 608*a* may include a memory, such as, for example, a set of RAM arrays in a Fast Fourier Transform or Inverse Fast Fourier Transform block (not shown) of the WLAN baseband processing circuitry 608*a*. Each of the WLAN baseband circuitry 608*a* and the BT baseband circuitry 608*b* may further include one or more processors and control logic to process the signals received from the corresponding WLAN or BT receive signal path of the radio IC circuitry 606*a-b*, and to also generate corresponding WLAN or BT baseband signals for the transmit signal path of the radio IC circuitry 606*a-b*. Each of the baseband processing circuitries 608*a* and 608*b* may further include physical layer (PHY) and medium access control layer (MAC) circuitry, and may further interface with a device for generation and processing of the baseband signals and for controlling operations of the radio IC circuitry 606*a-b*.

Referring still to FIG. 6, according to the shown embodiment, WLAN-BT coexistence circuitry 613 may include logic providing an interface between the WLAN baseband circuitry 608*a* and the BT baseband circuitry 608*b* to enable use cases requiring WLAN and BT coexistence. In addition, a switch 603 may be provided between the WLAN FEM circuitry 604*a* and the BT FEM circuitry 604*b* to allow switching between the WLAN and BT radios according to application needs. In addition, although the antennas 601 are depicted as being respectively connected to the WLAN FEM circuitry 604*a* and the BT FEM circuitry 604*b*, embodiments include within their scope the sharing of one or more antennas as between the WLAN and BT FEMs, or the provision of more than one antenna connected to each of FEM 604*a* or 604*b*.

In some embodiments, the front-end module circuitry 604*a-b*, the radio IC circuitry 606*a-b*, and baseband processing circuitry 608*a-b* may be provided on a single radio card, such as wireless radio card 602. In some other embodiments, the one or more antennas 601, the FEM circuitry 604*a-b* and the radio IC circuitry 606*a-b* may be provided on a single radio card. In some other embodiments, the radio IC circuitry 606*a-b* and the baseband processing circuitry 608*a-b* may be provided on a single chip or integrated circuit (IC), such as IC 612.

In some embodiments, the wireless radio card 602 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 608b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g. 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 7:
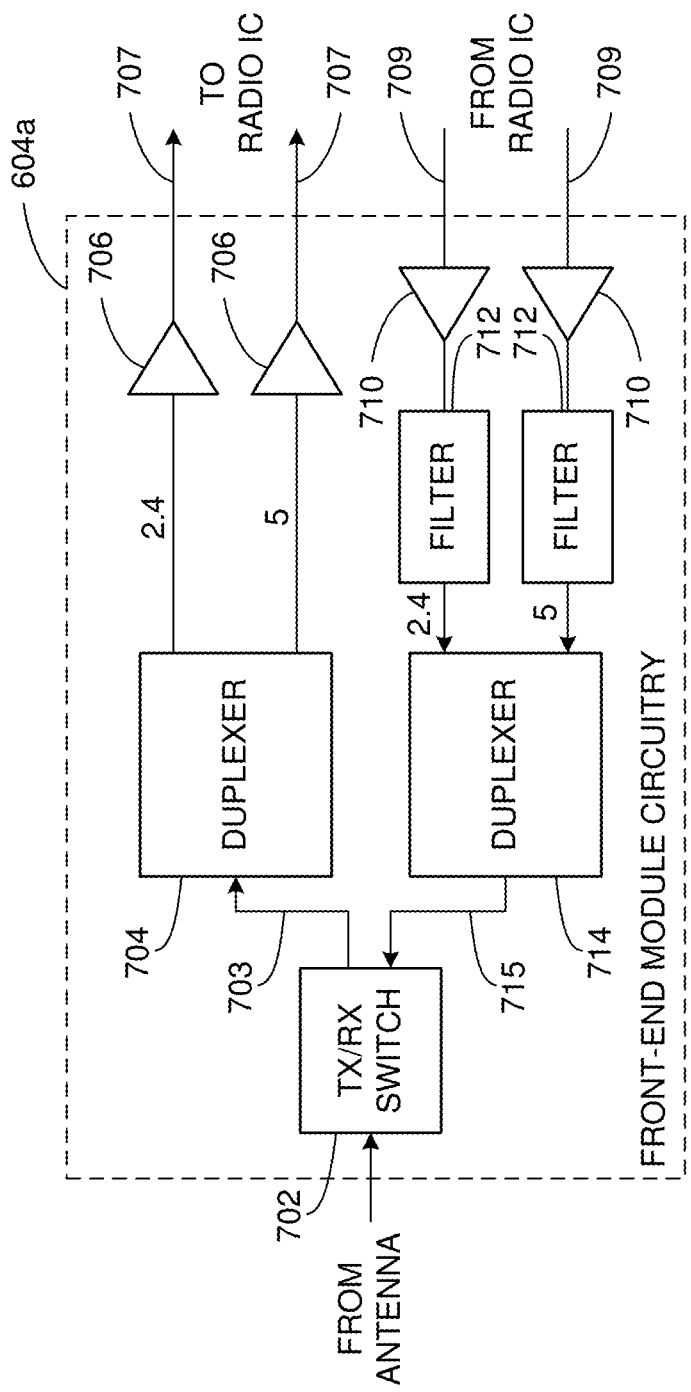
FIG. 7 illustrates an example front-end module circuitry for use in the radio architecture of FIG. 6, in accordance with one or more example embodiments of the present disclosure.

FIG. 7 illustrates WLAN FEM circuitry 604a in accordance with some embodiments. Although the example of FIG. 7 is described in conjunction with the WLAN FEM circuitry 604a, the example of FIG. 7 may be described in conjunction with the example BT FEM circuitry 604b (FIG. 6), although other circuitry configurations may also be suitable.

In some embodiments, the FEM circuitry 604a may include a TX/RX switch 702 to switch between transmit mode and receive mode operation. The FEM circuitry 604a may include a receive signal path and a transmit signal path. The receive signal path of the FEM circuitry 604a may include a low-noise amplifier (LNA) 706 to amplify received RF signals 703 and provide the amplified received RF signals 707 as an output (e.g., to the radio IC circuitry 606a-b (FIG. 6)). The transmit signal path of the circuitry 604a may include a power amplifier (PA) to amplify input RF signals 709 (e.g., provided by the radio IC circuitry 606a-b), and one or more filters 712, such as band-pass filters (BPFs), low-pass filters (LPFs) or other types of filters, to generate RF signals 715 for subsequent transmission (e.g., by one or more of the antennas 601 (FIG. 6)) via an example duplexer 714.

In some dual-mode embodiments for Wi-Fi communication, the FEM circuitry 604a may be configured to operate in either the 2.4 GHz frequency spectrum or the 5 GHz frequency spectrum. In these embodiments, the receive signal path of the FEM circuitry 604a may include a receive signal path duplexer 704 to separate the signals from each spectrum as well as provide a separate LNA 706 for each spectrum as shown. In these embodiments, the transmit signal path of the FEM circuitry 604a may also include a power amplifier 710 and a filter 712, such as a BPF, an LPF or another type of filter for each frequency spectrum and a transmit signal path duplexer 704 to provide the signals of one of the different spectrums onto a single transmit path for subsequent transmission by the one or more of the antennas 601 (FIG. 6). In some embodiments, BT communications may utilize the 2.4 GHz signal paths and may utilize the same FEM circuitry 604a as the one used for WLAN communications.

Figure 8:
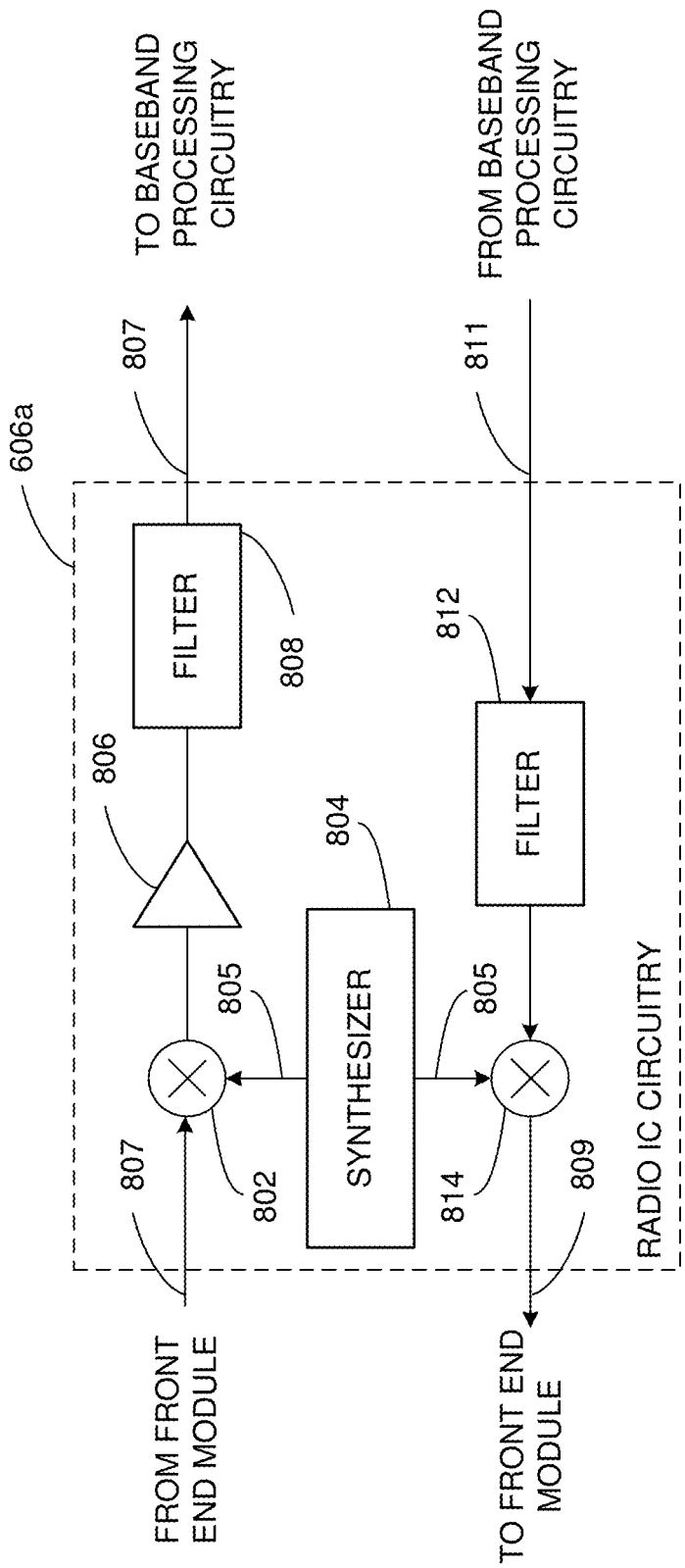
FIG. 8 illustrates an example radio IC circuitry for use in the radio architecture of FIG. 6, in accordance with one or more example embodiments of the present disclosure.

FIG. 8 illustrates radio IC circuitry 606a in accordance with some embodiments. The radio IC circuitry 606a is one example of circuitry that may be suitable for use as the WLAN or BT radio IC circuitry 606a/606b (FIG. 6), although other circuitry configurations may also be suitable. Alternatively, the example of FIG. 8 may be described in conjunction with the example BT radio IC circuitry 606b.

In some embodiments, the radio IC circuitry 606a may include a receive signal path and a transmit signal path. The receive signal path of the radio IC circuitry 606a may include at least mixer circuitry 802, such as, for example, down-conversion mixer circuitry, amplifier circuitry 806 and filter circuitry 808. The transmit signal path of the radio IC circuitry 606a may include at least filter circuitry 812 and mixer circuitry 814, such as, for example, up-conversion mixer circuitry. Radio IC circuitry 606a may also include synthesizer circuitry 804 for synthesizing a frequency 805 for use by the mixer circuitry 802 and the mixer circuitry 814. The mixer circuitry 802 and/or 814 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 8 illustrates only a simplified version of a radio IC circuitry, and may include, although not shown, embodiments where each of the depicted circuitries may include more than one component. For instance, mixer circuitry 814 may each include one or more mixers, and filter circuitries 808 and/or 812 may each include one or more filters, such as one or more BPFs and/or LPFs according to application needs. For example, when mixer circuitries are of the direct-conversion type, they may each include two or more mixers.

In some embodiments, mixer circuitry 802 may be configured to down-convert RF signals 707 received from the FEM circuitry 604*a-b* (FIG. 6) based on the synthesized frequency 805 provided by synthesizer circuitry 804. The amplifier circuitry 806 may be configured to amplify the down-converted signals and the filter circuitry 808 may include an LPF configured to remove unwanted signals from the down-converted signals to generate output baseband signals 807. Output baseband signals 807 may be provided to the baseband processing circuitry 608*a-b* (FIG. 6) for further processing. In some embodiments, the output baseband signals 807 may be zero-frequency baseband signals, although this is not a requirement. In some embodiments, mixer circuitry 802 may comprise passive mixers, although the scope of the embodiments is not limited in this respect.

In some embodiments, the mixer circuitry 814 may be configured to up-convert input baseband signals 811 based on the synthesized frequency 805 provided by the synthesizer circuitry 804 to generate RF output signals 709 for the FEM circuitry 604*a-b*. The baseband signals 811 may be provided by the baseband processing circuitry 608*a-b* and may be filtered by filter circuitry 812. The filter circuitry 812 may include an LPF or a BPF, although the scope of the embodiments is not limited in this respect.

In some embodiments, the mixer circuitry 802 and the mixer circuitry 814 may each include two or more mixers and may be arranged for quadrature down-conversion and/or up-conversion respectively with the help of synthesizer 804. In some embodiments, the mixer circuitry 802 and the mixer circuitry 814 may each include two or more mixers each configured for image rejection (e.g., Hartley image rejection). In some embodiments, the mixer circuitry 802 and the mixer circuitry 814 may be arranged for direct down-conversion and/or direct up-conversion, respectively. In some embodiments, the mixer circuitry 802 and the mixer circuitry 814 may be configured for super-heterodyne operation, although this is not a requirement.

Mixer circuitry 802 may comprise, according to one embodiment: quadrature passive mixers (e.g., for the in-phase (I) and quadrature phase (Q) paths). In such an embodiment, RF input signal 707 from FIG. 8 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 805 of synthesizer 804 (FIG. 8). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 707 (FIG. 7) may comprise a balanced signal, although the scope of the embodiments is not limited in this respect. The I and Q baseband output signals may be provided to low-noise amplifier, such as amplifier circuitry 806 (FIG. 8) or to filter circuitry 808 (FIG. 8).

In some embodiments, the output baseband signals 807 and the input baseband signals 811 may be analog baseband signals, although the scope of the embodiments is not limited in this respect. In some alternate embodiments, the output baseband signals 807 and the input baseband signals 811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 804 may be a fractional-N synthesizer or a fractional N/N+1 synthesizer, although the scope of the embodiments is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some embodiments, the synthesizer circuitry 804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 804 may be provided by a voltage controlled oscillator (VCO), although that is not a requirement. A divider control input may further be provided by either the baseband processing circuitry 608*a-b* (FIG. 6) depending on the desired output frequency 805. In some embodiments, a divider control input (e.g., N) may be determined from a look-up table (e.g., within a Wi-Fi card) based on a channel number and a channel center frequency as determined or indicated by the example application processor 610. The application processor 610 may include, or otherwise be connected to, one of the example secure signal converter 101 or the example received signal converter 103 (e.g., depending on which device the example radio architecture is implemented in).

In some embodiments, synthesizer circuitry 804 may be configured to generate a carrier frequency as the output frequency 805, while in other embodiments, the output frequency 805 may be a fraction of the carrier frequency (e.g., one-half the carrier frequency, one-third the carrier frequency). In some embodiments, the output frequency 805 may be a LO frequency (fLO).

Figure 9:
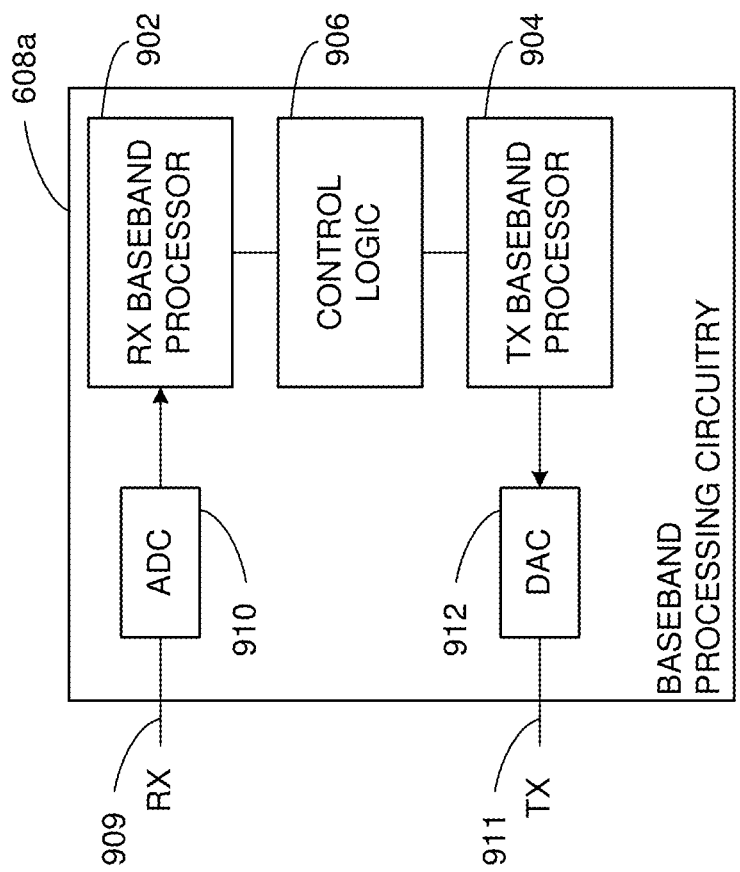
FIG. 9 illustrates an example baseband processing circuitry for use in the radio architecture of FIG. 6, in accordance with one or more example embodiments of the present disclosure.

FIG. 9 illustrates a functional block diagram of baseband processing circuitry 608*a* in accordance with some embodiments. The baseband processing circuitry 608*a* is one example of circuitry that may be suitable for use as the baseband processing circuitry 608*a* (FIG. 6), although other circuitry configurations may also be suitable. Alternatively, the example of FIG. 8 may be used to implement the example BT baseband processing circuitry 608*b* of FIG. 6.

The baseband processing circuitry 608*a* may include a receive baseband processor (RX BBP) 902 for processing receive baseband signals 809 provided by the radio IC circuitry 606a-b (FIG. 6) and a transmit baseband processor (TX BBP) 904 for generating transmit baseband signals 811 for the radio IC circuitry 606a-b. The baseband processing circuitry 608a may also include control logic 906 for coordinating the operations of the baseband processing circuitry 608a.

In some embodiments (e.g., when analog baseband signals are exchanged between the baseband processing circuitry 608a-b and the radio IC circuitry 606a-b), the baseband processing circuitry 608a may include ADC 910 to convert analog baseband signals 909 received from the radio IC circuitry 606a-b to digital baseband signals for processing by the RX BBP 902. In these embodiments, the baseband processing circuitry 608a may also include DAC 912 to convert digital baseband signals from the TX BBP 904 to analog baseband signals 911.

In some embodiments that communicate OFDM signals or OFDMA signals, such as through baseband processor 608a, the transmit baseband processor 904 may be configured to generate OFDM or OFDMA signals as appropriate for transmission by performing an inverse fast Fourier transform (IFFT). The receive baseband processor 902 may be configured to process received OFDM signals or OFDMA signals by performing an FFT. In some embodiments, the receive baseband processor 902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 6, in some embodiments, the antennas 601 (FIG. 6) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 601 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, (e.g., a smartphone), a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine one or more time division duplex (TDD) service periods (SPs); determine a directional multi-gigabit (DMG) frame to be sent to a responder device on a channel associated with a multiple-input multiple-output (MIMO) communication; cause to send the DMG frame to the responder device on the channel; and establish a MIMO channel access based on sending the DMG frame to the responder device.

Example 2 may include the device of example 1 and/or some other example herein, wherein the memory and the processing circuitry are further configured to determine available bandwidth channels based on sending a request to send (RTS) frame comprising a control trailer with a dedicated bandwidth field.

Example 3 may include the device of example 1 and/or some other example herein, wherein causing to send the DMG frame may be based on ignoring a physical layer (PHY) clear channel assessment (CCA) indication.

Example 4 may include the device of example 1 and/or some other example herein, wherein the MIMO channel access may be a single user MIMO (SU-MIMO) channel access.

Example 5 may include the device of example 1 and/or some other example herein, wherein the processing circuitry may be further configured to determine a first indication associated with a first status of a first antenna; determine a second indication associated with a second status of a second antenna; and cause to send the first indication and the second indication to an upper layer of the device.

Example 6 may include the device of example 1 and/or some other example herein, wherein the DMG frame may be a clear to send to self (CTS-to-self) frame.

Example 7 may include the device of example 6 and/or some other example herein, wherein the CTS-to-self frame may be appended with a control trailer.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver to cause to send the DMG frame.

Example 10 may include a non-transitory computer-readable medium storing computer-executable instructions which when executed by one or more processors result in performing operations comprising: determining one or more time division duplex (TDD) service periods (SPs); determining a directional multi-gigabit (DMG) frame to be sent to a responder device on a channel associated with a multiple-input multiple-output (MIMO) communication; causing to send the DMG frame to the responder device on the channel; and establishing a MIMO channel access based on sending the DMG frame to the responder device.

Example 11 may include the non-transitory computer-readable medium of example 10 and/or some other example herein, wherein the operations further comprise: determining a respective availability status of one or more channels; causing to send a request to send (RTS) frame to the responder device, wherein the RTS frame comprises a first control trailer comprising the respective availability status of the one or more channels indicated in a first bandwidth indication field; and identifying a clear to send (CTS) frame received from the responder device, wherein the CTS frame comprises a second control trailer, wherein the second control trailer comprises a second bandwidth indication field associated with one or more channels.

Example 12 may include the non-transitory computer-readable medium of example 10 and/or some other example herein, wherein causing to send the DMG frame may be based on ignoring a physical layer (PHY) clear channel assessment (CCA) indication.

Example 13 may include the non-transitory computer-readable medium of example can and/or some other example herein, wherein the MIMO channel access may be a single user MIMO (SU-MIMO) channel access.

Example 14 may include the non-transitory computer-readable medium of example 10 and/or some other example herein, wherein the operations further comprise; determining a first indication associated with a first status of a first antenna: determining a second indication associated with a second status of a second antenna; and causing to send the first indication and the second indication to an upper layer of the device.

Example 15 may include the non-transitory computer-readable medium of example 10 and/or some other example herein, wherein the DMG frame may be a clear to send to self (CTS-to-self) frame.

Example 16 may include the non-transitory computer-readable medium of example 15 and/or some other example herein, wherein the CTS-to-self frame may be appended with a control trailer.

Example 17 may include a method comprising: determining, by one or more processors, one or more time division duplex (TDD) service periods (SPs); determining a directional multi-gigabit (DMG) frame to be sent to a responder device on a channel associated with a multiple-input multiple-output (MIMO) communication; causing to send the DMG frame to the responder device on the channel; and establishing a MIMO channel access based on sending the DMG frame to the responder device.

Example 18 may include the method of example 17 and/or some other example herein, determining a respective availability status of one or more channels; causing to send a request to send (RTS) frame to the responder device, wherein the RTS frame comprises a first control trailer comprising the respective availability status of the one or more channels indicated in a first bandwidth indication field; and identifying a clear to send (CTS) frame received from the responder device, wherein the CTS frame comprises a second control trailer, wherein the second control trailer comprises a second bandwidth indication field associated with one or more channels.

Example 19 may include the method of example 17 and/or some other example herein, wherein causing to send the DMG frame may be based on ignoring a physical layer (PHY) clear channel assessment (CCA) indication.

Example 20 may include the method of example 17 and/or some other example herein, wherein the MIMO channel access may be a single user MIMO (SU-MIMO) channel access.

Example 21 may include the method of example 1 and/or some other example herein, further comprising determining a first indication associated with a first status of a first antenna; determining a second indication associated with a second status of a second antenna; and causing to send the first indication and the second indication to an upper layer of the device.

Example 22 may include the method of example 1 and/or some other example herein, wherein the DMG frame may be a clear to send to self (CTS-to-self) frame.

Example 23 may include the method of example 6 and/or some other example herein, wherein the CTS-to-self frame may be appended with a control trailer.

Example 24 may include an apparatus comprising means for: determining one or more time division duplex (TDD) service periods (SPs); determining a directional multi-gigabit (DMG) frame to be sent to a responder device on a channel associated with a multiple-input multiple-output (MIMO) communication; causing to send the DMG frame to the responder device on the channel; and establishing a MIMO channel access based on sending the DMG frame to the responder device.

Example 25 may include the apparatus of example 1 and/or some other example herein, further comprising: determining a respective availability status of one or more channels; causing to send a request to send (RTS) frame to the responder device, wherein the RTS frame comprises a first control trailer comprising the respective availability status of the one or more channels indicated in a first bandwidth indication field; and identifying a clear to send (CTS) frame received from the responder device, wherein the CTS frame comprises a second control trailer, wherein the second control trailer comprises a second bandwidth indication field associated with one or more channels.

Example 26 may include the apparatus of example 1 and/or some other example herein, wherein causing to send the DMG frame may be based on ignoring a physical layer (PHY) clear channel assessment (CCA) indication.

Example 27 may include the apparatus of example 1 and/or some other example herein, wherein the MIMO channel access may be a single user MIMO (SU-MIMO) channel access.

Example 28 may include the apparatus of example 1 and/or some other example herein, further comprising: determining a first indication associated with a first status of a first antenna; determining a second indication associated with a second status of a second antenna; and causing to send the first indication and the second indication to an upper layer of the device.

Example 29 may include the apparatus of example 1 and/or some other example herein, wherein the DMG frame may be a clear to send to self (CTS-to-self) frame.

Example 30 may include the apparatus of example 6 and/or some other example herein, wherein the CTS-to-self frame may be appended with a control trailer.

Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein Example 32 may include an apparatus comprising logic, modules, and/or circuitry to perform one or more elements of a method described in or related to any of examples 1-30, or any other method or process described herein.

Example 33 may include a method, technique, or process as described in or related to any of examples 1-30, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An initiating device in a multiple-input multiple-output (MIMO) channel access system, the initiating device comprising: processing circuitry coupled to storage, the processing circuitry configured to:
   determine one or more time division duplex service periods to be used for a single user (SU) MIMO communication;
   generate a first directional multi-gigabit (DMG) clear to send to self (CTS-to-self) frame appended with a first control trailer field;
   send the first DMG CTS-to-self frame in a first direction to a first responder device, wherein the first control trailer field indicates to the first responder device an SU-MIMO transmission requiring no response back from the first responder device, and
   wherein the first DMG CTS-to-self frame with the first control trailer field includes a transmit (TX) Sector Combination Index field indicating DMG antennas settings for the first responder device for an upcoming SU-MIMO transmission;
   send the first DMG CTS-to-self frame in a second direction to the first responder device; and
   establish an single user (SU) MIMO channel access for the SU MIMO communication with the first responder device.

2. The initiating device of claim 1, wherein the first control trailer field comprises a respective availability status of one or more channels.

3. The initiating device of claim 1, wherein the first DMG CTS-to-self frame is sent with a cyclic shift diversity (CSD) between the transmissions in different antennas.

4. The initiating device of claim 1, wherein the SU MIMO communication starts after a passage of a short inter-frame space (SIFS) time period.

5. The initiating device of claim 1, wherein the SU MIMO communication comprises sending and receiving physical layer protocol data units (PPDUs) with the first responder device.

6. The initiating device of claim 1, wherein the first control trailer indicates a corresponding DMG antenna configuration for the SU MIMO communication.

7. The initiating device of claim 1, wherein the first DMG CTS-to-self frame is transmitted using a same set of DMG antennas and antenna configuration planned to be used during the SU-MIMO communication.

8. The initiating device of claim 1, further comprising a transceiver configured to transmit and receive wireless signals.

9. The initiating device of claim 8, further comprising an antenna coupled to the transceiver to cause to send the first DMG CTS-to-self frame.

10. A non-transitory computer-readable medium storing computer-executable instructions which when executed by one or more processors result in performing operations comprising:
   determining one or more time division duplex service periods to be used for a single user (SU) multiple-input multiple-output (MIMO) communication;
   generating a first directional multi-gigabit (DMG) clear to send to self (CTS-to-self) frame appended with a first control trailer field;
   sending the first DMG CTS-to-self frame in a first direction to a first responder device, wherein the first control trailer field indicates to the first responder device an SU-MIMO transmission requiring no response back from the first responder device, and wherein the first DMG CTS-to-self frame with the first control trailer field includes a transmit (TX) Sector Combination Index field indicating DMG antennas settings for the first responder device for an upcoming SU-MIMO transmission;

sending the first DMG CTS-to-self frame in a second direction to the first responder device; and establishing an single user (SU) MIMO channel access for the SU MIMO communication with the first responder device.

11. The non-transitory computer-readable medium of claim 10, wherein the first control trailer field comprises a respective availability status of one or more channels.

12. The non-transitory computer-readable medium of claim 10, wherein the first DMG CTS-to-self frame is sent with a cyclic shift diversity (CSD) between the transmissions in different antennas.

13. The non-transitory computer-readable medium of claim 10, wherein the SU MIMO communication starts after a passage of a short inter-frame space (SIFS) time period.

14. The non-transitory computer-readable medium of claim 10, wherein the SU MIMO communication comprises sending and receiving physical layer protocol data units (PPDUs) with the first responder device.

15. The non-transitory computer-readable medium of claim 10, wherein the first control trailer indicates a corresponding DMG antenna configuration for the SU MIMO communication.

16. The non-transitory computer-readable medium of claim 10, wherein the first DMG CTS-to-self frame is transmitted using a same set of DMG antennas and antenna configuration planned to be used during the SU-MIMO communication.

17. A method in a multiple-input multiple-output (MIMO) channel access system, comprising:

determining, by one or more processors of an initiating device, one or more time division duplex service periods to be used for a single user (SU) MIMO communication;

generating a first directional multi-gigabit (DMG) clear to send to self (CTS-to-self) frame appended with a first control trailer field;

sending the first DMG CTS-to-self frame in a first direction to a first responder device, wherein the first control trailer field indicates to the first responder device an SU-MIMO transmission requiring no response back from the first responder device, and wherein the first DMG CTS-to-self frame with the first control trailer field includes a transmit (TX) Sector Combination Index field indicating DMG antennas settings for the first responder device for an upcoming SU-MIMO transmission;

sending the first DMG CTS-to-self frame in a second direction to the first responder device; and establishing an single user (SU) MIMO channel access for the SU MIMO communication with the first responder device.

18. The method of claim 17, wherein the first control trailer field comprises a respective availability status of one or more channels.

19. The method of claim 17, wherein the first DMG CTS-to-self frame is sent with a cyclic shift diversity (CSD) between the transmissions in different antennas.

20. The method of claim 17, wherein the SU MIMO communication starts after a passage of a short inter-frame space (SIFS) time period.

* * * * *